United States Patent
de Haas et al.

(10) Patent No.: US 10,914,814 B1
(45) Date of Patent: Feb. 9, 2021

(54) TWO PHASE TIME DIFFERENCE OF ARRIVAL LOCATION

(71) Applicant: Dialog Semiconductor B.V., 's-Hertogenbosch (NL)

(72) Inventors: Joek de Haas, 's-Hertogenbosch (NL); Sean McGrath, 's-Hertogenbosch (NL)

(73) Assignee: Dialog Semiconductor B.V., 's-Hertogenbosch (NL)

(*) Notice: Subject to any disclaimer, the term of this patent is extended or adjusted under 35 U.S.C. 154(b) by 0 days.

(21) Appl. No.: 16/727,816

(22) Filed: Dec. 26, 2019

(51) Int. Cl.
*G01S 5/14* (2006.01)
*G01S 5/02* (2010.01)
*G01S 5/12* (2006.01)
*H04W 64/00* (2009.01)

(52) U.S. Cl.
CPC .............. *G01S 5/14* (2013.01); *G01S 5/0252* (2013.01); *G01S 5/12* (2013.01); *H04W 64/006* (2013.01)

(58) Field of Classification Search
CPC ............ G01S 5/14; G01S 5/0252; G01S 5/12; H04W 64/006
USPC ....................................................... 455/456.1
See application file for complete search history.

(56) References Cited

U.S. PATENT DOCUMENTS

| | | | |
|---|---|---|---|
| 2009/0325524 A1* | 12/2009 | Oh .................. | G10L 21/038 455/205 |
| 2018/0348359 A1* | 12/2018 | Wall ................... | G01S 13/825 |
| 2019/0182796 A1* | 6/2019 | Wang ................. | H04W 64/003 |
| 2020/0021948 A1* | 1/2020 | Kratz ................... | H04W 4/02 |

* cited by examiner

*Primary Examiner* — Inder P Mehra
(74) *Attorney, Agent, or Firm* — Saile Ackerman LLC; Stephen B. Ackerman

(57) ABSTRACT

A method for a device for determining the location of a mobile transmitting device using a two phase time difference of arrival method and to a system using such a device are presented. There is a first radio node for calculating a location of a third radio node, for receiving, from the third radio node, a first ranging signal and for calculating, based on the first ranging signal, a first ranging parameter. The first radio node receives, from a second radio node, a second ranging signal, transmits to the second radio node a third ranging signal, calculates a phase offset between the first and second radio nodes based on the second and third ranging signals, and calculates a distance between the first and third radio nodes based on the phase offset between the first and second radio nodes based on the first ranging parameter.

13 Claims, 5 Drawing Sheets

TWO PHASE TIME DIFFERENCE OF ARRIVAL LOCATION

TECHNICAL FIELD

The invention relates to a device for determining the location of a mobile transmitting device using a two phase time difference of arrival method. The invention further relates to a method for a device for determining the location of a mobile transmitting device using a two phase time difference of arrival method and to a system comprising such a device.

BACKGROUND

Today's radio communication is complex and many current and emerging applications are populating the radio communication, where it is often desirable to locate the radio nodes or to determine the distance between two communicating radio nodes. This is used as the basis for finding location, asset tracking, navigation etc. Different distance measurement or ranging techniques are therefore studied in the literature.

Multilateration is a well-known surveillance technique based on the measurements of the difference in distance to a number of pair stations at known locations. In this technique, signals are broadcast to the stations at known times. By measuring the difference in distance of pairs of stations, the exact location of a device can be calculated.

Usually, for mobile devices, the difference in distance is calculated by measuring the time of arrival of packets, or phase differences of carriers. In order for these measurements to be consistent, all the stations involved need to be synchronous. Many ways of synchronizing the stations have been developed in the art. Very often, a common clock is distributed by connecting a wire or a fiber, or by using a separate wireless link. In many applications, the distribution of such a common clock presents severe problems, as for instance, the need to add additional wire or radio link, increase power consumption or increase in costs.

SUMMARY

It would be desirable to have an improved way of determining the location of a mobile device. To better address this concern, a first aspect of the invention provides a first radio node for calculating a location of a third radio node, wherein the first radio node is configured to receive, from the third radio node, a first ranging signal, calculate, based on the first ranging signal, a first ranging parameter, receive, from a second radio node, a second ranging signal, transmit, to the second radio node, a third ranging signal, calculate a phase offset between the first radio node and the second radio node based on the second ranging signal and the third ranging signal, and calculate a distance between the first radio node and the third radio node based on the phase offset between the first radio node and the second radio node and based on the first ranging parameter.

It will be appreciated by those skilled in the art that two or more of the above-mentioned embodiments, implementations, and/or aspects of the invention may be combined in any way deemed useful. Modifications and variations of the methods, which correspond to the described modifications and variations of the devices, can be carried out by a person skilled in the art on the basis of the present description.

BRIEF DESCRIPTION OF THE DRAWINGS

These and other aspects of the present invention will be discussed in more detail below, with reference to the attached drawings.

DESCRIPTION

Figure 1:
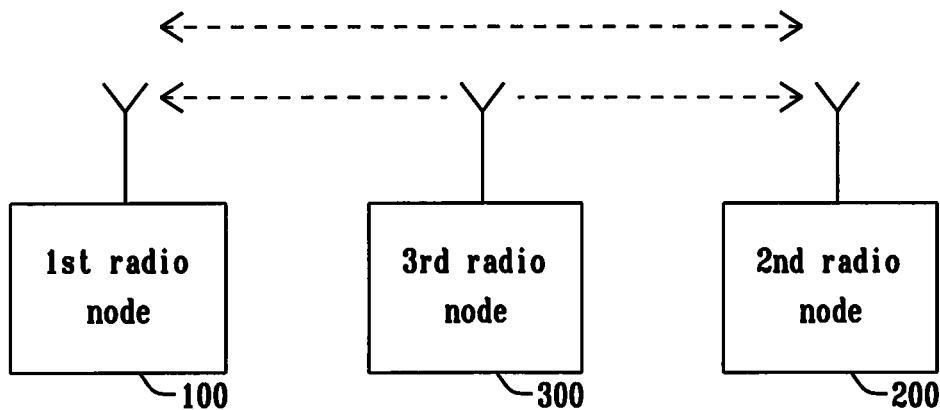
FIG. 1 shows a location determination system for a one dimensional case.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first element may be referred to as a second element without departing from the scope the present invention, and similarly, a second element may be referred to as a first element.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

For the purpose of determining the extent of protection conferred by the claims of this document, due account shall be taken of any element which is equivalent to an element specified in the claims.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the spirit and scope of the invention. In addition, descriptions of well-known functions and constructions may be omitted for clarity and conciseness.

The techniques disclosed herein can find utility as a method and device for determining location of a radio node by other radio nodes based on ranging signals without applying any clock synchronization among the other radio nodes. For example, in the so called "relay" attack in automotive key-fobs, where next to the exchange of security keys also the distance between key-fob and car is required. Current ranging solutions make use of modulated or unmodulated carriers and require some kind of synchronization among the other radio nodes. In order to avoid said synchronization, the techniques disclosed herein may be used. For instance, in a situation wherein a first radio node and a second radio node are used to determine the location of a third radio node, and there is an offset between a first clock at the first radio node and a second clock at the second radio node. In a first phase, the first radio node and the second radio node may receive ranging signals from the third radio node in order to determine a distance between the first radio node and the third radio node and/or between the second radio node and the third radio node wherein said distance may be a function of the offset between the first clock and the second clock. In a second phase, the first radio node and the second radio node may interchange further ranging signals in order to determine the offset between the first clock and the second clock such that the location of the third radio node can be calculated.

Various ranging measurement methods to calculate the Time-of-Flight (ToF) for radio network with multiple radio nodes can be performed using modulated carriers, either coherent or non-coherent, or using non-modulated carriers.

In the case of non-modulated carrier transmission, ranging measurements between two of the other radio nodes can be based on phase measurements of unmodulated carriers.

In the case of modulated carrier transmission, ranging measurement between two of the other radio nodes may be calculated based on time of arrival of the modulated carriers.

FIG. 1 shows as an example a system architecture for determining the location of a radio node based on ranging measurements in two phases. The location ranging measurement system architecture comprises a first radio node 100, a second radio node 200 and a third radio node 300. The first radio node 100 and the second radio node 200 are shown to be communicating wirelessly with each other using an appropriate communication standard. The third radio node 300 is shown to be transmitting signals wirelessly to the first radio node 100 and the second radio node 200 while the first radio node 100 and the second radio node 200 are shown to be receiving signals wirelessly from the third radio node 300 using an appropriate communication standard. The appropriate communication standard can be a server based wireless communication protocol, such as Wireless Fidelity (Wi-Fi), 2G, 3G, 4G, and upcoming 5G communication protocol etc., or a direct wireless communication protocol, or a combination of both. For example, the ranging signals themselves may be transmitted via direct wireless signals between the first radio node, the second radio node and the third radio node. Optionally, the third radio node 300 may be configured to also receive signals wirelessly from any of the first radio node 100 and the second radio node 200 while the first radio node 100 and the second radio node 200 may be configured to transmit signals wirelessly to the third radio node 300 using any appropriate communication standard such, for instance, any of the ones previously mentioned.

The location ranging measurements between the first radio node 100, the second radio node 200 and the third radio node 300 may be performed based on modulated and non-modulated radio carrier frequencies. Several kinds of modulations, for example, phase modulation, time width modulation, amplitude modulation etc., can be used by the radio node devices.

Figure 2:
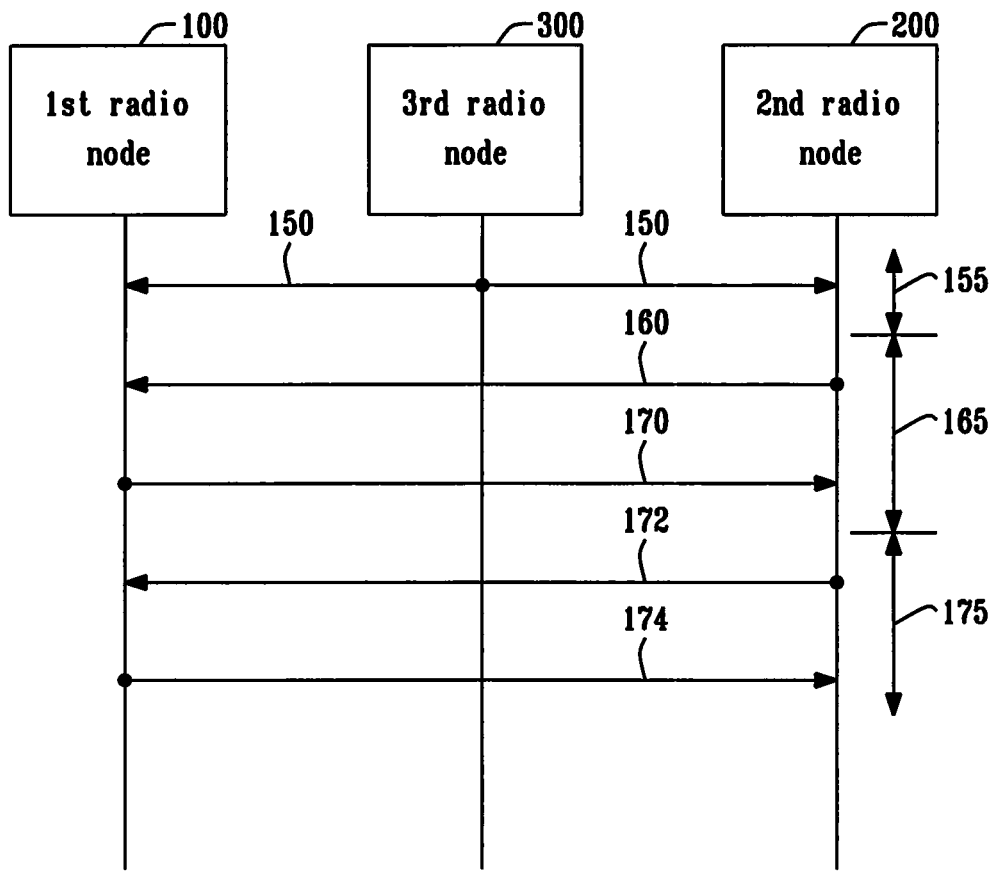
FIG. 2 shows a diagram with ranging signals interchanged in a location determination system.

FIG. 2 shows a diagram with ranging signals of a system comprising a first radio node 100 and a second radio node 200 for determining a position of a third radio node 300. The diagram comprises a broadcast phase 155, an alignment phase 165 and a data interchange phase 175. During the broadcast phase 155, the third radio node 300 transmits a ranging signal 150, which is referred to hereinafter as the "first ranging signal". The first ranging signal 150 is received by the first radio node 100 and by the second radio node 200. The first radio node 100 calculates a first ranging parameter based on the received first ranging signal 150 and the second radio node 200 calculates a second ranging parameter based on the received first ranging signal 150.

In the alignment phase 165, the second radio node 200 transmits a ranging signal 160 to the first radio node 100, which is referred to hereinafter as the "second ranging signal", to the second radio node 200. Also in the alignment phase 165, the first radio node 100 transmits a ranging signal 170 to the second radio node 200, which is referred to hereinafter as the "third ranging signal". Then the first radio node 100 calculates a third ranging parameter based on the second ranging signal 160, and the second radio node 200 calculates a fourth ranging parameter based on the third ranging signal 170. Although FIG. 2 shows that the second ranging signal 160 is transmitted before the third ranging signal 170, the third ranging signal 170 may also be transmitted before or at the same time than the second ranging signal 160.

In the data interchange phase 175, the first radio node 100 and the second radio node 200 may interchange the first, the second, the third and/or the fourth ranging parameter. For instance, the first radio node 100 may transmit the first ranging parameter and/or the third ranging parameter to the second radio node 200 via a first data interchange signal 174 and/or the second radio node 200 may transmit the second and/or the fourth ranging parameter to the first radio node 100 via a second data interchange signal 172. Optionally, only the first radio node 100 may receive the second and the fourth ranging parameters from the second radio node 200 or only the second radio node 200 may receive the first and the third ranging parameters from the first radio node 100. In another embodiment, the interchange of the first ranging parameter and/or the second ranging parameter may be performed during the broadcast phase 155 via extra data interchange signals or at any other suitable moment.

The offset between the first clock signal generated by the first clock generator of the first radio node 100 and the second clock signal generated by the second clock generator of the second radio node 200 can be determined based on the third ranging parameter and the fourth ranging parameter thereby allowing to determine the location of the third radio node 300 based on said offset and the first ranging parameter and the second ranging parameter.

Figure 3:
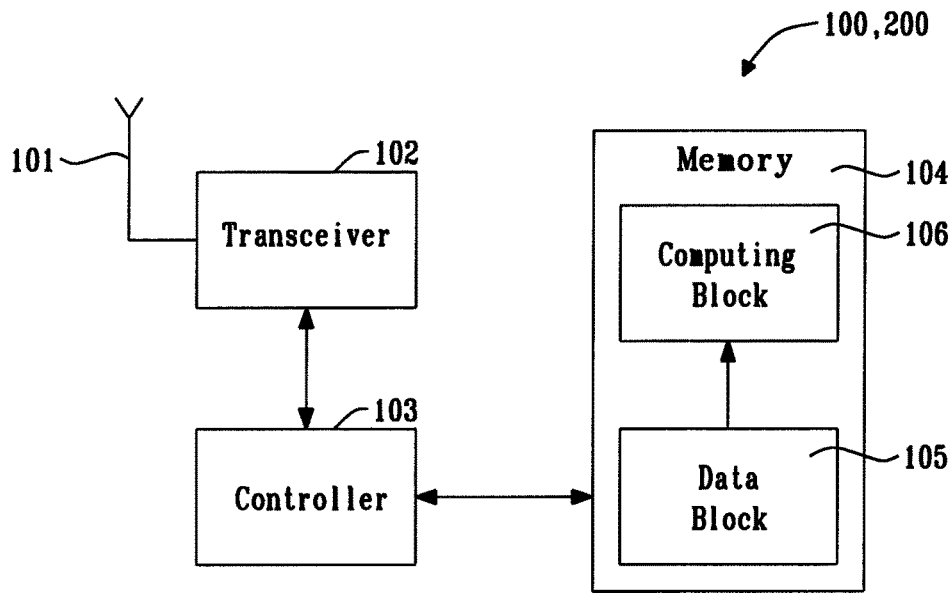
FIG. 3 shows a radio node.

FIG. 3 shows a block diagram of an example of a radio node for performing location ranging measurements. The radio node may comprise an antenna 101, a transceiver 102, a controller 103 and a memory 104. The antenna 101 is connected to the transceiver 102 and is used for transmitting and/or receiving a signal. The antenna 101 may be used for sending and/or receiving signals wirelessly, from and to a radio node, using an appropriate communication standard. The controller 103 controls operation of the radio node including the transceiver 102 and the memory 104. The data block 105 of the memory 104 may be used to store various data. The computing block 106 may comprise executable computer code that implements a method for performing location ranging measurements by the radio node. The block diagram of the radio node, shown in FIG. 3, may be used to operate as the first radio node 100 or as the second radio node 200, or as the third radio node 300, or as all of them.

In one example, the radio node may function as the first radio node 100 used for performing location ranging measurement, where during a broadcast phase the transceiver 102 may be configured to receive a first ranging signal 150, from a third radio node 300, using antenna 101. Under the control of the controller 104, the computing block 106 may be configured to determine a first ranging parameter based on the first ranging signal 150. During an alignment phase, the transceiver 102 may be further configured to receive a second ranging signal 160 from the third radio node 300 and to send a third ranging signal 170 to the third radio node 300. Under the control of the controller 104, the computing block 106 may be configured to determine a third ranging parameter based on the second ranging signal 170. The transceiver 102 may be configured to receive a first data interchange signal 172 comprising information indicating the second ranging parameter and the fourth ranging parameter, from the third radio node 300, using antenna 101. Under the control of the controller 103, the computing block 106 may then determine a phase offset between the first radio node 100 and the second radio node 200 based on the third ranging parameter and the fourth ranging parameter. Furthermore, also under the control of the controller 103, the computing block 106 may then determine a range of the second radio node 200 based on the phase offset, the first ranging parameter and the second ranging parameter.

For example, in a system as the one shown in FIG. 1 wherein a first radio node 100 and a second radio node 200 are used to determine the position of a third radio node 300, during a broadcast phase the third radio node 300 may send a modulated carrier packet at a time $t_0$ (i.e., the first ranging signal 150 transmitted by the third radio node 300) which will be received by the first radio node 100 at a time $t_1$ after travelling over a distance r (wherein r represents the distance between the first radio node 100 and the third radio node 300). The measured time of arrival of the packet relative to the clock system of the first radio node 100 (i.e., the first ranging parameter) as calculated at the first radio node 100, can be given as below:

$$t_1 = r/c + t_0 \qquad \text{equation (1)}$$

wherein $t_0$ represents the time at which the first ranging signal 150 was sent by the third radio node 300 and c represents the speed of light in a medium.

The same modulated carrier packet sent by the radio node 300 at time $t_0$ is received by the second radio node 200 at a time $t_2$ after travelling over a distance d–r, wherein d represents the distance between the first node 100 and the second node 200 and d–r represents the distance between the second radio node 200 and the third radio node 300, the measured time of arrival of the packet relative to the clock system of the second radio node 200 (i.e., the second ranging parameter) as calculated at the second radio node 200, can be given as below:

$$t_2 = \frac{d-r}{c} + t_0 + \delta_{12} \qquad \text{equation (2)}$$

wherein $\delta_{12}$ represents an unknown phase offset between the clock system of the first radio node 100 and the clock system of the second radio node 200. As also mentioned above, each of the first radio node and the second radio node have their own individual clock sources which are not running at exactly the same phase.

Both the first and the second radio nodes need to exchange their respective time of arrival measurement results $t_1$ and $t_2$ (i.e., the first and the second ranging parameters) with each other. As explained with regard to FIG. 2, this can be done during the broadcast phase or later on during the exchange phase.

Based on said time of arrival of the packet measurements $t_1$ and $t_2$, a distance r from the first radio node 100 to the third radio node 300 can be calculated at the first radio node 100 as a function of the unknown phase offset $\delta_{12}$ as shown below:

$$r = \frac{d + (c*(t1-t2)) + (c*\delta_{12})}{2} \qquad \text{equation (3)}$$

In the same way, a distance (d–r) from the second radio node 200 to the third radio node 300 can also be obtained.

Thus the first radio node 100 and/or the second radio node 200 can calculate the range between each of them and the third radio node 300 as a function of the unknown phase offset. Then, the unknown phase offset $\delta_{12}$ between the local clock systems of the first radio node 100 and the second radio node 200 needs to be determined in order to obtain the location of the third radio node 300.

In the alignment phase and as explained with regard to FIG. 2, the first radio node 100 and the second radio node 200 will transmit some ranging signals in order to determine the phase offset $\delta_{12}$. For this, the second radio node 200 transmits a modulated carrier packet to the first radio node 100 (i.e., the second ranging signal 160) at a time $t_3$. Said modulated carrier packet (second ranging signal 160) is received by the first radio node 100 at a time $t_4$ after having traveled over the distance d that separates the first radio node 100 from the second radio node 200. The measured time of arrival $t_4$ of the packet relative to the clock system of the first radio node 100 (i.e., the third ranging parameter) can be calculated at the first radio node 100 as below:

$$t_4 = d/c - \delta_{12} + t_3 \qquad \text{equation (4)}$$

wherein $t_3$ represents the time at which the second ranging signal 160 was sent by the second radio node 200.

During alignment phase and in order to determine the phase offset $\delta_{12}$, the first radio node 100 will also transmit a modulated carrier packet (i.e., the third ranging signal 170)

to the second radio node 200 at a time $t_5$, Said modulated carrier packet (third ranging signal 170) will be received by the second radio node at a time $t_6$ after having traveled the distance d between the first radio node 100 and the second radio node 200. The measured time ($t_6$) of arrival of the packet relative to the clock system of the second radio node 200 (i.e., the fourth ranging parameter) can be calculated at the second radio node 200 as given below:

$$t_6 = d/c + \delta_{12} + t_5 \quad \text{equation (5)}$$

wherein $t_5$ represents the time at which the third ranging signal 170 was sent by the first radio node 100.

As explained in relation to FIG. 2, both the first and the second radio nodes need to exchange their respective time of arrival measurement results $t_6$ and $t_5$ (the third and fourth ranging parameters) with each other.

Based on the time of arrival of the packet measurements $t_6$ and $t_5$ (i.e., based on the third and fourth ranging parameters), the first radio node 100 and/or the second radio node 200 can determine the unknown phase offset $\delta_{12}$ as shown below:

$$\delta_{12} = \frac{(t6 - t5)}{2}$$

As phase offset $\delta_{12}$ between the local clock system of the first radio node 100 and the local clock system of the second radio node 200 is known, the first radio node 100 can determine the range between the first radio node 100 and the third radio node 300 based on equation (3) and the second radio node 200 can determine the range between the second radio node 200 and the third radio node 300 based on equation (4).

In this way, and as it has been stated before, the location of a radio node has been determined in several phases wherein first all radio nodes except the radio node to be located receive transmissions of the radio node to be located, and then all the radio nodes (except the radio node to be located) are interacting to determine their individual phases thereby allowing to determine the location of a radio node in situations in multiple stations are involved to localize a device and the system lacks legacy synchronization methods or is unpractical to have common clock distribution among the radio nodes.

In real situations the phase offset $\delta_{12}$ is not a constant over time. Small clock frequency variations between the radio nodes require the time lapse between the broadcast phase and the alignment phase to be constraint. For example, for a given clock frequency offset of 10 parts per million (ppm) and a time lapse between phase 1 and phase 2 of 100 microseconds (us), the accuracy will decrease by 1 nanosecond (ns), i.e., approximately by 30 centimeter (cm).

The above method could also be used if unmodulated carriers are used as ranging signals instead of using modulated carrier packets. In that case, phases of the received unmodulated carriers may be calculated and used as the ranging parameters, instead of calculating time of arrivals of packets. Using phase of the arrived signals instead of using arrival time of the signals is equivalent and well known (see for instance https://en.wikipedia.org/wiki/Multilateration). Thus, it will not be explained here.

Although, the location of the third radio node has been determined based on the calculation of distances from a first radio node and a second radio node (i.e., for the one dimension case), any other number of radio nodes and distances from those radio nodes to the third radio node could be used. Also any other number of radio nodes could be located.

Figure 4A:
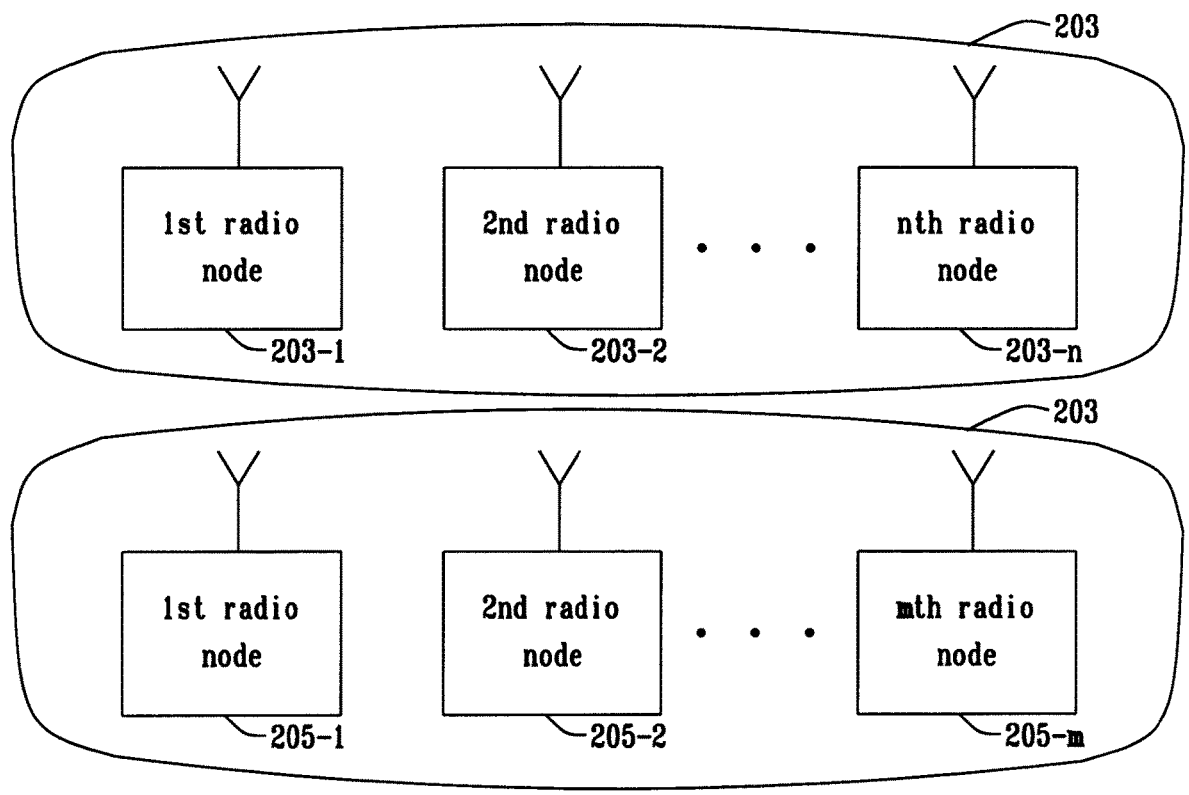
FIG. 4A shows a location determination system comprising a group of radio nodes to be located and a group of radio nodes to colaborate in order to determine said location.

FIG. 4A represents a system comprising a first group of radio nodes 203 comprising a number n of radio nodes 203-1, 203-2, ..., 203-n and a second group of radio nodes 205 that collaborate to locate the comprising a number m of radio nodes 205-1, 205-2, ..., 205-m wherein the n radio nodes of the first group 203 collaborate to locate the m radio nodes of the second group 205 as it has been explained in relation to FIGS. 1-3.

Figure 4B:
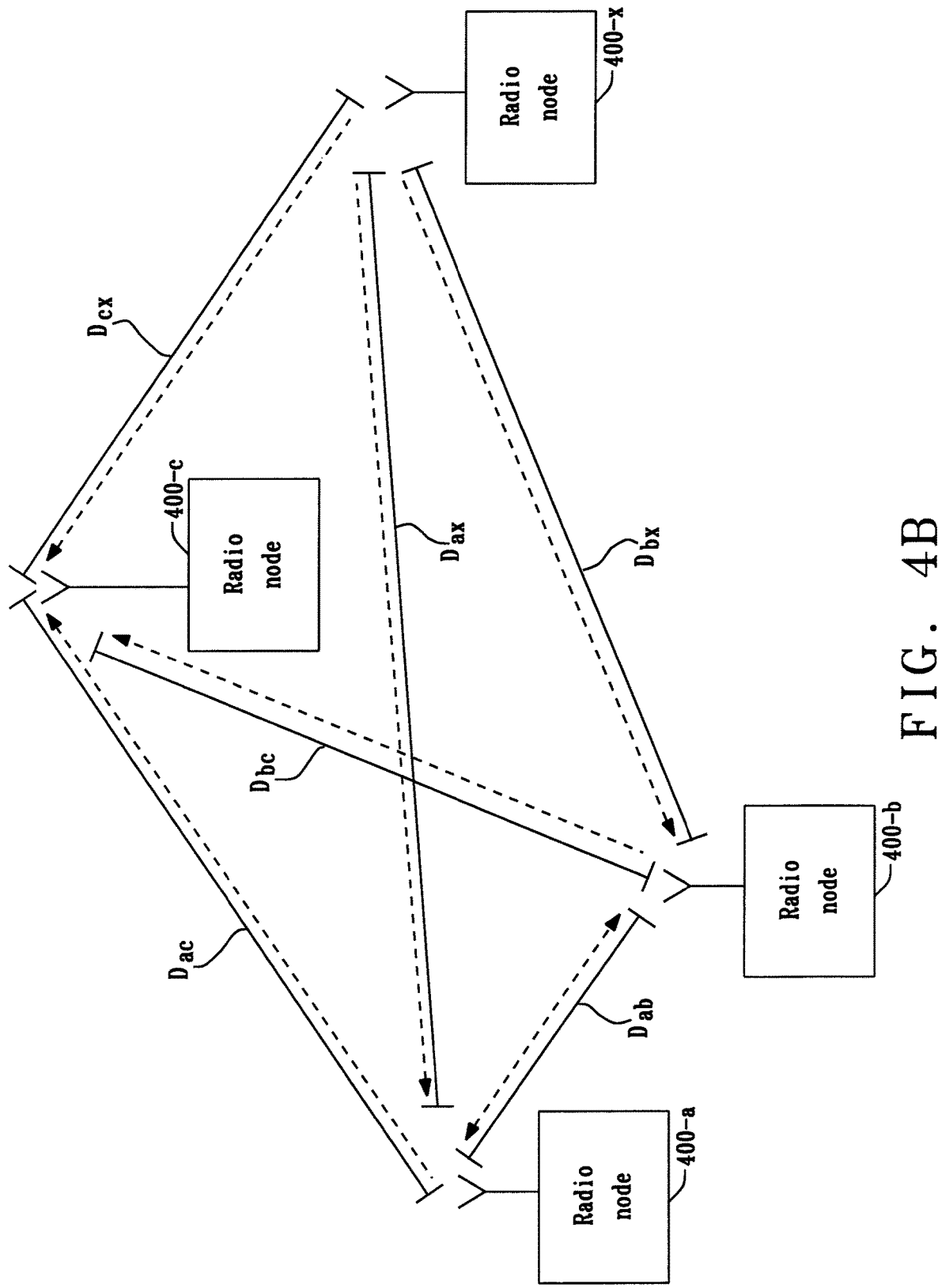
FIG. 4B shows a location determination system for a two dimensional case.

FIG. 4B shows a system comprising a radio node 400-a, a radio node 400-b, and a radio node 400-c wherein $D_{ab}$ is the distance between the radio node 400-a and the radio node 400-b, $D_{ac}$ is the distance between the radio node 400-a and the radio node 400-c and $D_{bc}$ is the distance between the radio node 400-c and the radio node 400-b. The distances $D_{ab}$, $D_{ac}$ and $D_b$c are known by the radio nodes 400-a, 400-b and 400-c. FIG. 4B shows further another radio node 400-x located at an unknown distance $D_{ax}$ from the radio node 400-a, at an unknown distance $D_{bx}$ from the radio node 400-b and at an unknown distance $D_{cx}$ from the radio node 400-c. The radio nodes 400-a, 400-b and 400-c are arranged to collaborate to determine the position of the radio node 400-x. Each of the radio nodes has its own local clock system such that the radio node 400-a has a time reference $t_{0a}$, the radio node 400-b has a time reference $t_{0b}$, the radio node 400-c has a time reference $t_{0c}$, and the radio node 400-x has a time reference $t_{0x}$.

In order to determine the position of the radio node 400-x, during a first broadcasting phase, the radio node 400-x transmits a first ranging signal at a time $t_{0x}$ which will be received by the radio node 400-a at a time $R_{a1}$, by the radio node 400-b at a time $R_{b1}$ and by the radio node 400-c at a time $R_{c1}$ given by the below equations (1):

$$R_{a1} = t_{0x} + D_{ax}/c - t_{0a}$$

$$R_{b1} = t_{0x} + D_{bx}/c - t_{0b}$$

$$R_{c1} = t_{0x} + D_{cx}/c - t_{0c}$$

During the alignment phase, the radio node 400-b transmits a ranging signal to the radio node 400-a which is received at the radio node 400-a at a time $R_{a2}$, the radio node 400-a transmits a ranging signal to the radio node 400-b which is received at the radio node 400-b at a time $R_{b2}$, and the radio node 400-a transmits a ranging signal to the radio node 400-c which is received at the radio node 400-c at a time $R_{c2}$ wherein the arriving times $R_{a2}$, $R_{b2}$ and $R_{c2}$ are given by the below system of equations (2):

$$R_{a2} = t_{0a} + D_{ab}/c - t_{0b}$$

$$R_{b2} = t_{0b} + D_{ab}/c - t_{0a}$$

$$R_{c2} = t_{0c} + D_{ac}/c - t_{0a}$$

Instead of the radio node 400-a transmitting to the radio node 400-c, another options would be possible such that a system with 3 equations and 3 unknown parameters $t_{0a}$, $t_{0b}$ and $t_{0c}$ is formed and it is possible to calculate the time references of each radio node 400-a, 400-a, and 400-c. For instance, the radio node 400-b could transmit a ranging signal to the radio node 400-c.

The radio nodes 400-a, 400-b, and 400-c may then proceed to interchange the different arrival times that they have calculated such that each radio node can solve the system of equations (2) and obtain the time references $t_{0a}$, $t_{0b}$ and $t_{0c}$. another possibility would be that only one of the radio nodes 400-a, 400-b and 400-c obtains the different times of arrivals and solves the system of equations (2) and then said radio node transmits the calculated time references $t_{0a}$, $t_{0b}$ and to $t_{0c}$ the other two radio nodes.

Finally, as all the radio nodes 400-a, 400-b and 400-c have the time references $t_{0a}$, $t_{0b}$ and $t_{0c}$, they can solve the respective distances $D_{ax}$, $D_{bx}$ and $D_{cx}$ to the radio node 400-x.

By applying multilateration to the set of differential distances $D_{ax}$, $D_{bx}$ and $D_{cx}$, the position of the radio node 400-x can be determined by solving the below system of equations (3):

$$D_{ax} = \sqrt{[(x-x_1)^2 + (y-y_1)^2]}$$

$$D_{bx} = \sqrt{[(x-x_2)^2 + (y-y_2)^2]}$$

$$D_{cx} = \sqrt{[(x-x_3)^2 + (y-y_3)^2]}$$

Wherein the position of the radio node 400-a is known and given by the Cartesian coordinates $(x_1, y_1)$, the position of the radio node 400-b is known and given by the Cartesian coordinates $(x_2, y_2)$, the position of the radio node 400-c is also known and given by the Cartesian coordinates $(x_3, y_3)$ and the position of the radio node 400-x is given by the Cartesian coordinates $(x, y)$, is not known and can be determined by solving the system of equations (3).

Figure 5A:
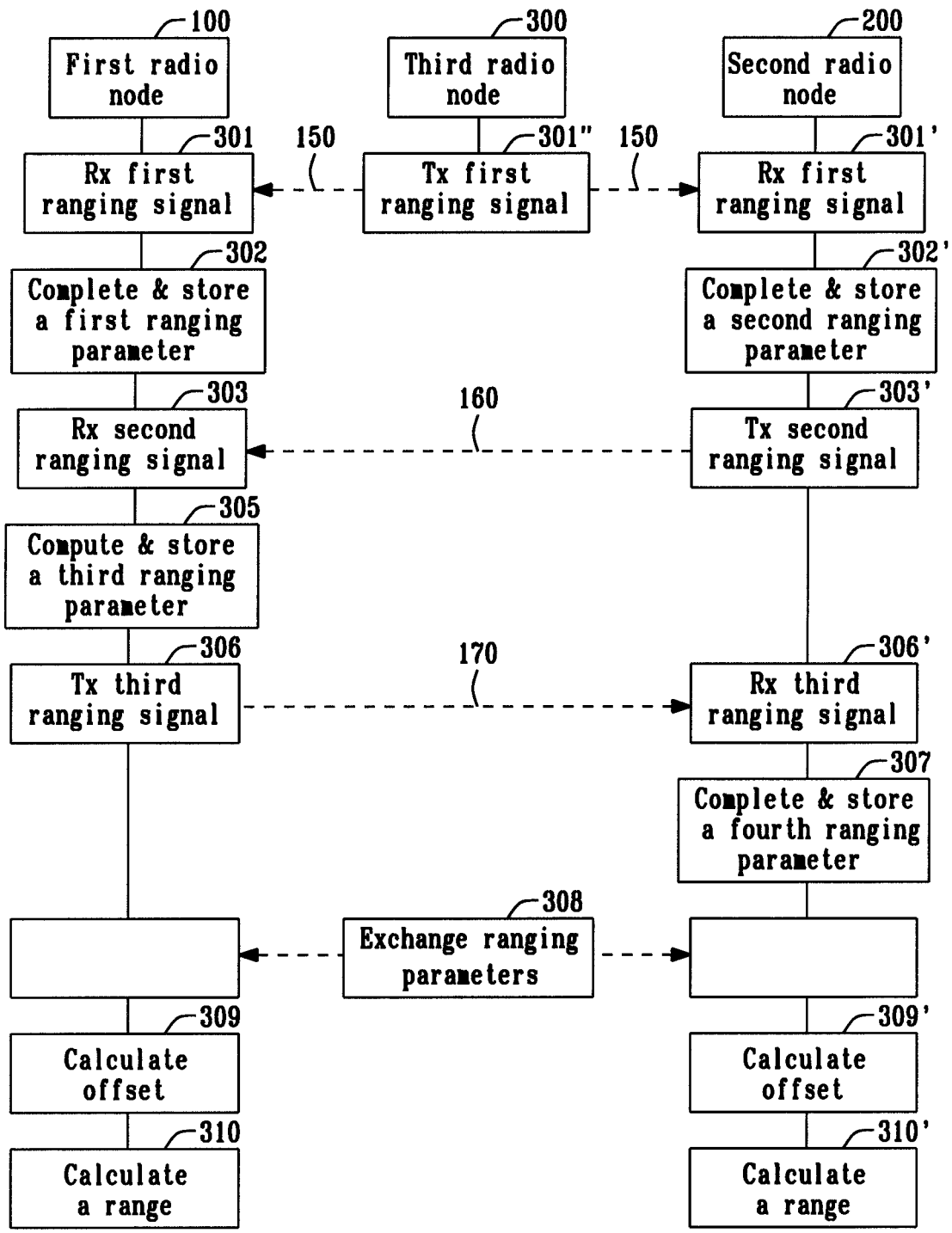
FIG. 5A shows a time diagram of a system for determining the location of a radio node.

FIG. 5A illustrates an example of how the first radio node 100, the second radio node 200 and the third radio node 300 can cooperate to determine the location of the third radio node 300.

In step 301, step 301' and step 301'', the broadcast phase 155 starts wherein the third radio node transmits the first ranging signal 150 and the first radio node 100 and the second radio node 200 receive the first ranging signal 150.

In step 302 and step 302' of the broadcast phase 155, the first radio node 100 computes and stores the first ranging parameter based on the received first ranging signal 150, and the second radio node 200 computes and stores the second ranging parameter based on the received first ranging signal 150. For example, the first ranging parameter and the second ranging parameter can be one of phase, if the first ranging signal comprises a non-modulated carrier, or time of arrival, if the first ranging signal comprises a modulated carrier.

In step 303 and step 303', the alignment phase 165 starts and the second radio node 200 transmits the second ranging signal 160 to the first radio node 100. In step 305, the first radio node 100 computes and stores the third ranging parameter based on the received second ranging signal 160. For example, the third ranging parameter can be one of phase, if the second ranging signal comprises a non-modulated carrier, or one of a time of arrival, if the second ranging signal comprises a modulated carrier.

In step 306 and step 306', the first radio node 100 transmits the third ranging signal 170 to the second radio node 200. In step 307, the second radio node 200 computes and stores the fourth ranging parameter based on the received third ranging signal 170. For example, the fourth ranging parameter can be one of phase, if the third ranging signal comprises a non-modulated carrier, or one of a time of arrival, if the third ranging signal comprises a modulated carrier.

In step 308, the first and the second ranging nodes interchange the first, the second, the third and the fourth ranging parameters.

In step 309 and step 309', the first radio node 100 and the second radio node 200 calculate the phase offset between the clock system of the first radio node and the clock system of the second radio node. In step 310 and step 310', the first radio node 100 and the second radio node 200 calculate respectively the distance from the first radio node and from the second radio node to the third radio node based on the first ranging parameter, the second ranging parameter and the offset thereby determining the location of the third radio node 300.

FIG. 5A illustrates an example of how the first radio node 100, the second radio node 200 and the third radio node 300 can cooperate to determine the location of the third radio node 300.

In step 301, step 301' and step 301'', the broadcast phase 155 starts wherein the third radio node transmits the first ranging signal 150 and the first radio node 100 and the second radio node 200 receive the first ranging signal 150.

In step 302 and step 302' of the first phase 155, the first radio node 100 computes and stores the first ranging parameter based on the received first ranging signal 150, and the second radio node 200 computes and stores the second ranging parameter based on the received first ranging signal 150. For example, the first ranging parameter and the second ranging parameter can be one of phase, if the first ranging signal comprises a non-modulated carrier, or time of arrival, if the first ranging signal comprises a modulated carrier. In step 302'', the first and the second ranging nodes interchange the first and the second ranging parameters.

In step 303 and step 303', the second phase 165 starts and the second radio node 200 transmits the second ranging signal 160 to the first radio node 100. In step 305, the first radio node 100 computes and stores the third ranging parameter based on the received second ranging signal 160. For example, the third ranging parameter can be one of phase, if the second ranging signal comprises a non-modulated carrier, or one of a time of arrival, if the second ranging signal comprises a modulated carrier.

In step 306 and step 306', the first radio node 100 transmits the third ranging signal 170 to the second radio node 200. In step 307, the second radio node 200 computes and stores the fourth ranging parameter based on the received third ranging signal 170. For example, the fourth ranging parameter can be one of phase, if the third ranging signal comprises a non-modulated carrier, or one of a time of arrival, if the third ranging signal comprises a modulated carrier.

In step 308, the first and the second ranging nodes interchange the third and the fourth ranging parameters.

In step 309 and step 309', the first radio node 100 and the second radio node 200 calculate the phase offset between the clock system of the first radio node and the clock system of the second radio node. In step 310 and step 310', the first radio node 100 and the second radio node 200 calculate respectively the distance from the first radio node and from the second radio node to the third radio node based on the first ranging parameter, the second ranging parameter and the offset thereby determining the location of the third radio node 300.

Figure 5B:
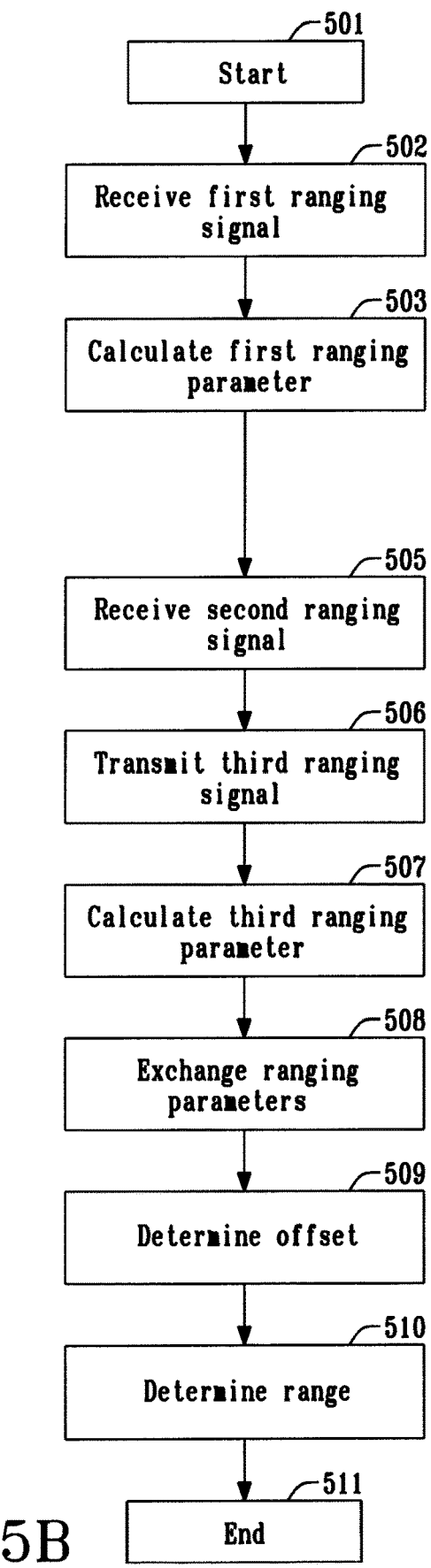
FIG. 5B shows a flowchart of a method for determining the location of a radio node.

FIG. 5B shows a flow chart of a method for determining position of a third radio node 300 by a first radio node 100 in cooperation with a second radio node 200.

The method starts in step 501. In step 502, the first radio node 100 receives the first ranging signal 150 from the third radio node 300.

In step 503, the first radio node 100 computes and stores the first ranging parameter based on the received first ranging signal 150. For example, the first ranging parameter can be one of phase, if the first ranging signal comprises a non-modulated carrier, or a time of arrival, if the first ranging signal comprises a modulated carrier. In step 505, the first radio node 100 receives the second ranging signal 160 from the second radio node 200. In step 506, the first radio node 100 transmits the third ranging signal 170 to the second radio node 200. In step 507, the first radio node 100 computes and stores the third ranging parameter based on the received second ranging signal 160. For example, the third ranging parameter can be one of phase, if the second ranging signal comprises a non-modulated carrier, or one of a time of arrival, if the second ranging signal comprises a modulated carrier.

In step 508, the first radio node transmits the first and the third ranging parameters to the second radio node 200 and receives a second and fourth ranging parameters from the second radio node 200.

In step 509, the first radio node 100 calculates the phase offset between the clock system of the first radio node and the clock system of the second radio node. In step 510, the first radio node 100 calculates the distance from the first radio node to the third radio node based on the first ranging parameter, the second ranging parameter and the offset in order to determine the location of the third radio node 300.

It will be appreciated that the invention also applies to computer programs, particularly computer programs on or in a carrier, adapted to put the invention into practice. The program may be in the form of a source code, an object code, a code intermediate source and object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a flash drive or a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or to be used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

What is claimed is:

1. A first radio node for calculating a location of a third radio node, wherein the first radio node is configured to:
   Receive, from the third radio node, a first ranging signal;
   Calculate, based on the first ranging signal, a first ranging parameter;
   Receive, from a second radio node, a second ranging signal;
   Transmit, to the second radio node, a third ranging signal;
   Receive, from the second radio node, information indicating a second ranging parameter, wherein the second ranging parameter is based on the first ranging signal;
   Calculate a phase offset between the first radio node and the second radio node based on the second ranging signal and the third ranging signal; and
   Calculate a distance between the first radio node and the third radio node based on the phase offset between the first radio node and the second radio node and based on the first ranging parameter and the information indicating the second ranging parameter.

2. The first radio node according to claim 1, wherein the first radio node is further configured to calculate the location of the third radio node based on the distance between the first radio node and the second radio node.

3. The first radio node according to claim 1, wherein the first radio node is further configured to:
   Calculate, based on the received second ranging signal at the first radio node, a third ranging parameter; and
   wherein the calculation of the phase offset between the first radio node and the second radio node is further based on the third ranging parameter.

4. The first radio according to claim 1, wherein the first radio node is further configured to:
   Receive, from the second radio node, information indicating a fourth ranging parameter, wherein the information indicating the fourth ranging parameter is based on the third ranging signal; and
   wherein the calculation of the phase offset between the first radio node and the second radio node is further based on the information indicating the fourth ranging parameter.

5. The first radio node according to claim 1, wherein the first radio node is further configured to transmit the first ranging parameter to the second radio node.

6. The first radio node according to claim 1, wherein the first radio node is further configured to:
receive the information indicating the third ranging parameter from the second radio node; and
wherein the calculation of the phase offset between the first radio node and the second radio node is further based on the information indicating the third ranging parameter.

7. A system comprising a first radio node and a second radio node for calculating a location of a third radio node,
wherein the first radio node is configured to receive a first ranging signal from the third radio node, to calculate, based on the first ranging signal, a first ranging parameter, and to transmit a second ranging signal to the second radio node;
wherein the second radio node is configured to receive the first ranging signal from the third radio node, to calculate, based on the second ranging signal, a second ranging parameter, and to transmit information indicating the second ranging parameter and a third ranging signal to the second radio node;
wherein the first radio node is further configured to calculate a phase offset between the first radio node and the second radio node based on the second ranging signal and the third ranging signal and to calculate a distance between the first radio node and the third radio node based on the phase offset, the information indicating the second ranging parameter and the first ranging signal.

8. A method for calculating a location of a third radio node by a first radio node, the method comprising:
Receiving, by the first radio node, a first ranging signal from the third radio node;
Receiving, by the first radio node, a second ranging signal from a second radio node;
Transmitting, by the first radio node, a third ranging signal to the second radio node;
Receiving, by the first radio node, information indicating a second ranging parameter from the second radio node, wherein the second ranging parameter is based on the first ranging signal;
Calculating a phase offset between the first radio node and the second radio node based on the second ranging signal and the third ranging signal; and
Calculating a distance between the first radio node and the third radio node based on the phase offset, the information indicating the second ranging parameter and the first ranging signal.

9. The method according to claim 8, further comprising calculating the location of the third radio node based on the distance between the first radio node and the second radio node.

10. The method according to claim 8, further comprising:
Calculating, based on the received second ranging signal at the first radio node, a third ranging parameter;
wherein the calculation of the phase offset between the first radio node and the second radio node is further based on the third ranging parameter.

11. The method according to claim 8, further comprising:
Receiving, from the second radio node, information indicating a fourth ranging parameter, wherein the information indicating the fourth ranging parameter is based on the third ranging signal;
wherein the calculation of the phase offset between the first radio node and the second radio node is further based on the information indicating the fourth ranging parameter.

12. The method according to claim 8, further comprising transmitting the first ranging parameter to the second radio node.

13. The method according to claim 8, further comprising:
receiving the information indicating the third ranging parameter from the second radio node; and
wherein the calculation of the phase offset between the first radio node and the second radio node is further based on the information indicating the third ranging parameter.

* * * * *